March 11, 1947.  O. T. FRANCIS  2,417,070

ELECTRONIC TIME INDICATING DEVICE

Filed Jan. 4, 1945

Inventor
Oliver T Francis

Patented Mar. 11, 1947

2,417,070

UNITED STATES PATENT OFFICE 2,417,070

ELECTRONIC TIME INDICATING DEVICE

Oliver T. Francis, Renville, Minn.

Application January 4, 1945, Serial No. 571,314

13 Claims. (Cl. 161—15)

This invention relates to electronic time indicating devices, and more particularly to a means for indicating the duration of an impulse or the duration between two impulses.

In my application, Ser. No. 499,757, filed August 24, 1943, entitled "Impulse duration responsive or indicating device," now U. S. Patent 2,399,668, I illustrated a duration indicating device comprising a resistance in parallel with a condenser connected in the common input output circuit of a vacuum tube, selectors comprising voltage magnitude operated vacuum tubes, connected across said condenser and a transformer connected in said output circuit for generating a pulse at the end of said duration to render said selectors operative only at the end of said duration. While the apparatus described in that application is regarded as ideal for certain uses, it is more complicated than required for certain other uses. It is one of the objects of this invention to provide a duration indicating device which shall be simple, light in weight, inexpensive to construct and accurate.

I have observed that a vacuum tube circuit such as described in the preceding paragraph produces a voltage across the secondary of the transformer at the expiration of a negative impulse proportional to the duration of the negative voltage applied to the input circuit of said vacuum tube. Accordingly, it is one of the objects of this invention to provide an accurate means of measuring said voltage across the secondary as an indication of said duration.

In certain signal duration indicating devices the signal recurs at a predetermined frequency. In sonic range finders, for example, sound pulses may be sent out at a frequency of two or three times per second and the duration of the time from transmission to reception of said impulses is measured. According to one feature of my invention I provide a means for producing voltage surges varying in magnitude with the duration of a recurrent time interval and a means for producing a second voltage varying with the envelope of said surges as an indication of said duration.

In certain time measuring devices, it is desired to determine the period between the operation of two signal generators. For example, the time duration to be determined may be the delay between applying a voltage to a circuit closing relay and the time when the contacts of said relay close. According to one feature of my invention I provide a plurality of vacuum tubes having a condenser in parallel with a resistance connected in their common input output circuit, a first signal generator for impressing a positive potential on the input circuit of a first of said tubes to charge said condenser, a second signal generator for impressing a positive pulse on the input circuit of a second of said tubes, the primary of a transformer connected in the output circuit of said second tube, and means for indicating the magnitude of the voltage across the secondary of said transformer as an indication of the period of time between the operation of said generators. According to another feature I provide means whereby said indicating means may be operated only by the second generator and not by the first.

These and other objects of my invention will become apparent from the following description, claims and figures, wherein:

In the figures the same number is assigned to elements performing the same function.

Figure 1:
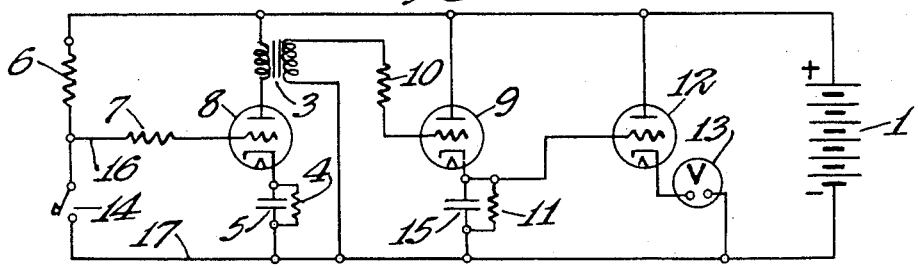
Fig. 1 is a signal duration indicating device.

Referring to Fig. 1 the duration indicating device is provided with a source of "B" battery 1. Vacuum tube 8 may be a triode having resistance 4 in parallel with condenser 5 connected in its common input output circuit. The primary of transformer 3 is connected in its output circuit. Its grid is connected through a current limiting resistance 7 to line 16 and to a source of negative input voltage, here shown as key 14, connected between lines 16 and 17. Line 17 is connected to the negative terminal of battery 1. A resistance 6 maintains the grid of tube 8 at a high positive potential when key 14 is open.

One terminal of the secondary of transformer 3 is connected to the negative terminal of battery 1. The other terminal is connected through current limiting resistance 10 to the grid of vacuum tube 9. The plate of tube 9 is connected to the positive terminal of battery 1. Condenser 15 in parallel with resistance 11 is connected in its common input output circuit.

The grid of vacuum tube 12 is connected to the cathode of tube 9. Its plate is connected to the positive terminal of battery 1. Voltmeter 13 is connected in its common input output circuit.

In operation, when key 14 is opened a positive potential is impressed on the grid of vacuum tube 8 from the positive terminal of battery 1 through high resistances 6 and 7, and current is permitted to flow from the positive terminal of battery 1, through primary of transformer 3, plate to filament of tube 8, condenser 5, to negative terminal of battery 1, thereby charging condenser 5. If key 14 is closed the grid of tube 8 is connected to the negative of battery 1 through resistance 7, which renders the plate impedance of tube 8 substantially infinite. The charge leaks from condenser 5 through resistance 4 at a rate determined by the R.-C. time element. When key 14 is again opened the grid of tube 8 assumes a positive potential. At the instant of opening of key 14 the voltage of battery 1 is divided across the primary of transformer 3, the plate impedance of tube 8 and condenser 5. As the plate impedance of tube 8 is very small when its grid is positive, the voltage drop of battery 1 appears almost entirely across the primary of transformer 3 and condenser 5. The more the charge of condenser 5 that has leaked off during the duration of time that key 14 is closed, the greater the voltage drop across the primary of transformer 3, when key 14 is opened. The magnitude of the voltage across the primary of transformer 3 therefore varies with the duration of the period that key 14 is closed. The voltage across the secondary of transformer 3 is proportional to the voltage across its primary and is measured by a vacuum tube voltmeter comprising tubes 9, 12 and their associated circuits. The positive surge of voltage across secondary of transformer 3 is applied to the grid of tube 9 through resistance 10, and permits condenser 15 to be charged from battery 1, through the plate impedance of tube 9 to a magnitude of voltage depending on the magnitude of the positive surge from said secondary. The R.-C. time element of condenser 15, resistance 11 is sufficiently high to retain this charge on condenser 15 until it can be read from a voltmeter 13 connected in the common input output circuit of cathode follower vacuum tube 12, the grid of which tube is connected to the cathode of tube 9. The magnitude of voltage across voltmeter 13 is therefore an indication of the duration of the input negative voltage produced by closing key 14.

Figure 2:
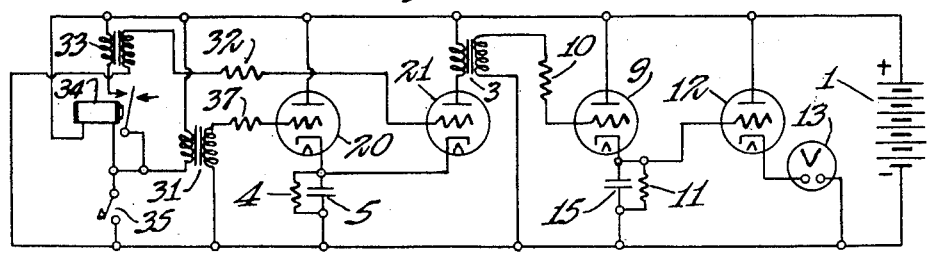
Fig. 2 shows a means for indicating the duration between the operation of two signal generators.

Referring to Fig. 2, I have shown a means for indicating the duration between two positive pulses. The means for generating the two positive pulses is here shown as an electro-magnetic relay, one pulse being produced when the current is applied to the winding of said relay and the second pulse being produced when the contacts of said relay close.

In Fig. 2 one terminal of the winding of relay 34 is connected to the positive terminal of battery 1. The other terminal is connected through key 35 to the negative terminal of battery 1. One terminal of the primary of transformer 31 is connected to the positive terminal of the battery. The other terminal is connected through key 35 to the negative terminal of battery 1. One terminal of the secondary of transformer 31 is connected to the negative terminal of battery 1. The other terminal of the secondary is connected through resistance 37 to the grid of vacuum tube 20. The plate of vacuum tube 20 is connected to the positive terminal of battery 1. Its filament is connected through resistance 4 in parallel with condenser 5 to the negative terminal of battery 1.

One terminal of the primary of transformer 33 is connected to the positive terminal of battery 1. The other terminal is connected through contacts of relay 34 and key 35 to the negative terminal of battery 1. One terminal of the secondary of transformer 33 is connected to the negative terminal of battery 1. Its other terminal is connected through resistance 32 to the grid of cathode follower vacuum tube 21. The filament of tube 21 is connected to the filament of tube 20. The plate of tube 21 is connected through the primary of transformer 3 to the positive terminal of battery 1. One terminal of the secondary of transformer 3 is connected to the negative terminal of battery 1. Its other terminal is connected through resistance 10 to the grid of vacuum tube 9. The plate of vacuum tube 9 is connected to the positive terminal of battery 1. Its filament is connected through resistance 11 in parallel with condenser 15 to the negative terminal of battery 1. The grid of tube 12 is connected to the filament of tube 9. Its plate is connected to the positive terminal of battery 1. Its filament is connected through voltmeter 13 to the negative terminal of battery 1.

In operation when key 35 is closed current flows from the positive terminal of battery 1 through the primary of transformer 31, key 35 to the negative terminal of battery 1. The secondary of transformer 31 impresses a positive pulse on the grid of tube 20 through resistance 37, charging condenser 5 through the plate impedance of tube 20.

Current flowing through the winding of relay 34 closed its contact a duration of time after key 35 is closed. Current then flows from the positive terminal of battery 1 through the primary of transformer 33, closed contact of relay 34, key 35 to the negative terminal of battery 1. The secondary of transformer 33 impresses a positive pulse on the grid of tube 21 through resistance 32. Current then flows from the positive terminal of battery 1 through the primary of transformer 3, the plate impedance of tube 21 charging condenser 5. As described in Fig. 1 above the magnitude of voltage appearing across the primary of transformer 3 is dependent on the amount of charge that has leaked off condenser 5 during the duration between the closing of key 35 and contact of relay 34. The voltage across the secondary of transformer 3 is measured by voltmeter 13 as described in explaining the operation of Fig. 1, and is an indication of the magnitude of said duration. Since the time element to be here measured may be of the order of .002 second key 35 may be closed and opened at a frequency of about ten times per second thereby giving a more steady reading on voltmeter 13.

Figure 3:
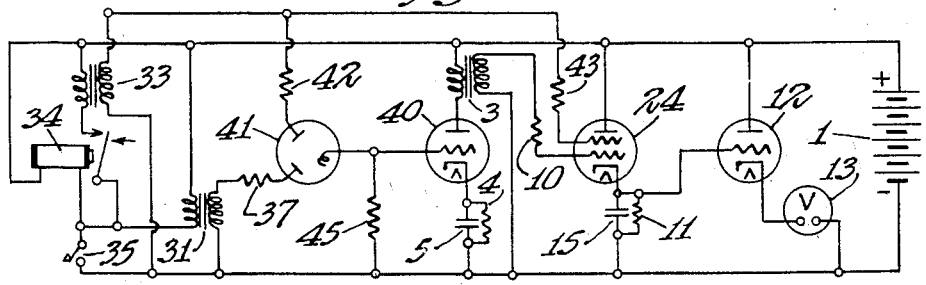
Fig. 3 is a modification of Fig. 2.

Fig. 3 shows a modified means for measuring the time delay between the closing of key 35 and closing of contacts of relay 34, in which vacuum tube 40, with resistance 4 and condenser 5 connected in its input output circuit has primary of transformer 3 connected in its output circuit. The means for applying the plurality of positive pulses from time displaced generators comprising secondaries of transformers 31 and 33, consists of a rectifier 41 having a plurality of anode terminals, and a cathode connected to the grid of tube 40. The means for measuring the voltage across the secondary of transformer 3 consists of a plural grid vacuum tube 24, having its anode connected to the positive terminal of battery 1 and resistance 11 in parallel with condenser 15 connected in its common input output circuit.

In operation when key 35 is closed a positive pulse is applied to the grid of tube 40 across resistance 45 by the secondary of transformer 31 through resistance 37, one anode and cathode of rectifier 41. Condenser 5 is charged from battery 1 through the primary of transformer 3, and the plate impedance of tube 40. This impresses a positive charge on the first grid of vacuum tube 24 through high resistance 10, but no plate current flows in tube 24 to charge condenser 15 due to the fact that its second grid is connected to the negative terminal of battery 1 through resistance 43 and secondary of transformer 33. At the expiration of the duration to be measured when current passes from battery 1 through primary of transformer 33, a positive pulse passes from one terminal of the secondary of transformer 33 through resistance 42, a second anode of rectifier 41 to its cathode and through resistance 45 to the other terminal of said secondary. The grid of tube 40 becomes positive and the magnitude of the voltage drop across the primary of transformer 3 is dependent on the amount of current which leaked off of condenser 5 during the duration to be measured, that is the time between closing of key 35 and contacts of relay 34. The second grid of tube 24 being positive by reason of the positive pulse impressed thereon by the secondary of transformer 33 through resistance 43, condenser 15 charges through the plate impedance of vacuum tube 24 to a magnitude determined by the magnitude of the voltage across the secondary of transformer 3. The magnitude of the charge on condenser 15 is indicated by voltmeter 13 as described for Fig. 1. Closing of key 35 several times per second gives a more steady reading in voltmeter 13 as described for Fig. 2.

Figure 4:
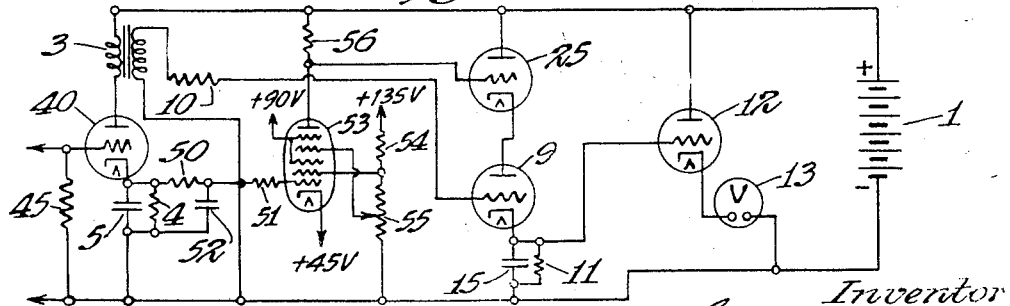
Fig. 4 is a means for indicating the duration between two impulses.

Fig. 4 shows a modification of Fig. 3 for measuring the duration between the reception of two positive pulses such as those produced across resistance 45 of Fig. 3. In Fig. 4 the first of the positive pulses charges condenser 5 from battery 1 through primary of transformer 3 and produces a positive voltage through high resistance 10 on the grid of tube 9, but condenser 15 does not charge by reason of the fact that tube 53 is conductive to space current and the grid of tube 25 is negative. When the second pulse appears across the secondary of transformer 3 the plate impedance of tube 53 has become substantially infinite as hereinafter explained. The grid of tube 25 is positive and when the grid of tube 9 is thrown positive tubes 25 and 9 are both conductive to space current, charging condenser 15 to a value depending on the magnitude of the voltage across the secondary of transformer 3. The charge on condenser 15 is registered in voltmeter 13 as described for Fig. 1.

Tube 53 may be of the conventional pentigrid converter type. Its cathode is connected to battery 1 at a point more positive than its negative terminal such as plus 45 volts. Its first grid is connected through a high resistance 51, through condenser 52 to the negative terminal of battery 1. The voltage across condenser 5 is applied to the first grid of tube 53 through a time delay network comprising resistance 50 and condenser 52. Its anode grid is connected to a positive terminal of battery 1 through resistance 54 and to the negative of battery 1 through potentiometer 55. Its third and fifth grids are connected together internally and to a positive terminal of battery 1. Its fourth grid is connected to an intermediate point on potentiometer 55. Its plate is connected through resistance 56 to the positive terminal of battery 1.

If the grid of tube 40 has received no positive pulse for a period sufficient for condenser 5 to discharge through resistance 4 to a little less than 45 volts for example, the first grid of tube 53 is slightly negative with respect to its cathode. The plate impedance of tube 53 is then small. This produces a large voltage drop through resistance 56 and the grid of tube 25 is sufficiently negative to prevent charge of condenser 15 even though secondary of transformer 3 were to impress a positive pulse on the grid of tube 9.

When however condenser 5 is charged as a result of first positive pulse being impressed on grid of tube 40 the first grid of tube 53 assumes a positive potential with increased voltage drop through resistance 54 and lowers the potential of the fourth grid of tube 53 sufficiently to render the plate impedance of tube 53 substantially infinite. When the second positive pulse is impressed on the grid of tube 9 the grid of tube 25 is positive permitting condenser 15 to charge through the plate impedance of tubes 9 and 25, which in turn is registered by voltmeter 13 as an indication of the duration of the time between said two positive pulses. If these two pulses are repeated at regular intervals the reading on voltmeter 13 is more steady as described for Fig. 2.

While the voltage across the secondary of transformer 3 might be measured by a conventional type of vacuum tube voltmeter, such as for example of the "C" bias vacuum tube detector type, I prefer to use a demodulator such as vacuum tube 9 having a resistance 11 in parallel with condenser 15 connected in its common input output circuit. This type of demodulator has the advantage over the conventional type that high amperage surges passing from the positive terminal of battery 1 through the plate impedance of tube 9 and condenser 15 produce minimum deleterious coupling effects on the other elements of the circuit.

I have shown a means of producing voltages of desired durations and pulses separated by desired durations, my invention is not directed to the means of producing such input voltages, however. Various means for producing voltages having such characteristics are known. My invention is directed to the duration indicating means.

It is obvious that my invention may take widely different forms from those illustrated, and it is to be limited in scope only as defined in the following claims.

What I claim is:

1. In a circuit for indicating the duration of negative voltages, a vacuum tube having an input and an output circuit, a resistance in parallel with a condenser connected in said input and said output circuit, the primary of a transformer and a source of current connected in said output circuit, means for normally applying a positive potential to said input circuit to charge said condenser, means for applying said negative voltages to said input circuit, means for indicating the voltage across the secondary of said transformer at the end of said duration, said means for indicating the voltage across said secondary comprising a second vacuum tube having a plate circuit and a grid circuit, a resistance and a condenser connected in parallel in said plate circuit and said grid circuit, means for connecting said source of current in said plate circuit, means for applying positive surges across the secondary of said transformer to said grid circuit, and means for indicating voltage variations across said last condenser.

2. In a circuit for indicating the duration of input voltages, means for producing positive pulses varying in magnitude with said duration of said input voltages, a vacuum tube having an input and an output circuit, a resistance in parallel with a condenser connected in said input and said output circuit, a source of current connected in said output circuit, means for applying said positive pulses to said input circuit to impress a charge on said condenser varying in magnitude with the magnitude of said positive pulses, and means for indicating the magnitude of said charge on said condenser.

3. In a circuit for indicating the duration between two pulses, a plurality of vacuum tubes having input and output circuits, a resistance in parallel with a condenser connected in the common input output circuits of both of said tubes, a source of current connected in the common output circuits of both of said tubes, means for applying a first of said pulses to the input circuit of a first of said tubes to charge said condenser by current flowing in said output circuit of said first tube, means for applying a second of said pulses to the input circuit of a second of said tubes to charge said condenser by current flowing in the output circuit of said second tube, the primary of a transformer connected in the output circuit of said second tube, and means for indicating the magnitude of voltage variations across the secondary of said transformer.

4. In a circuit for indicating the duration between two positive pulses, a vacuum tube having an input and an output circuit, a resistance in parallel with a condenser connected in said input and said output circuit, a source of current and the primary of a transformer connected in said output circuit, means for applying said pulses to said input circuit to charge said condenser, means for indicating the magnitude of voltage across the secondary of said transformer, and means for rendering said means for indicating responsive only to voltages produced across said secondary by the second of said pulses.

5. In a circuit for indicating the duration between two positive pulses, a vacuum tube having an input and an output circuit, a resistance in parallel with a condenser connected in said input and said output circuit, a source of current and the primary of a transformer connected in said output circuit, means for applying said pulses to said input circuit to charge said condenser, means for indicating the magnitude of voltage across the secondary of said transformer, means for rendering said means for indicating responsive only to voltages produced across said secondary by the second of said pulses, said indicating means comprising a second vacuum tube having a plate and a plurality of grids, a second resistance in parallel with a condenser connected in the common circuit of said plate, and both of said grids, a source of current connected in said output circuit, means for applying the voltage across said secondary to a first of said grids, means for rendering a second of said grids negative when a first of said pulses is received and positive when a second of said pulses is received, and means for indicating voltage variations across said last condenser.

6. In a circuit for indicating the duration between two positive pulses cyclically repeated at intervals greater than said duration, a vacuum tube having an input and an output circuit, an impedance and a condenser connected in parallel in said input and said output circuit, the primary of a transformer and a source of current connected in said output circuit, means for applying said pulses to said input circuit to charge said condenser with current flowing in said output circuit, and means for indicating the voltage remaining on said condenser at the end of said duration.

7. In a circuit for indicating the duration between two positive pulses separated from other pulses by an interval greater than said duration, a vacuum tube having an input and an output circuit, a resistance in parallel with a condenser connected in said input and said output circuit, the primary of a transformer and a source of current connected in said output circuit, indicating means for the voltage produced across the secondary of said transformer by the pulses at the end of the duration, and means for rendering said indicating means non-responsive to the surges across said transformer produced by said first pulse.

8. In a circuit for indicating the duration between two pulses separated from other pulses by an interval greater than said duration, a vacuum tube having an input and an output circuit, a resistance shunted by a condenser connected in said input and said output circuit, a source of current and the primary of a transformer connected in said output circuit, means for applying said pulses to said input circuit to charge said condenser by current flowing in said output circuit, a vacuum tube voltmeter for indicating the magnitude of the positive voltage surges produced across the secondary of said transformer, said voltmeter comprising a plural grid vacuum tube device having an output circuit, a second resistance in parallel with a second condenser connected in the common circuits of said grids and said output of said device, means for applying said positive voltage surges to a first of said grids, means for controlling a second of said grids by the voltage remaining on said first condenser at the end of said interval to render said device non-conductive to the positive surge produced across said secondary by a first of said pulses, and means for indicating voltage variations across said second condenser.

9. In a circuit for indicating the duration of input voltages, a vacuum tube having an input and an output circuit, means for applying said input voltages to said input circuit, a resistance in parallel with a condenser connected in said input and said output circuit, the primary of a transformer and a source of current connected in said output circuit, indicating means for the voltage across the secondary of said transformer and means for rendering said indicating means non-responsive to voltages above a predetermined magnitude across said secondary.

10. In a signal duration indicating device, a vacuum tube having an input and an output circuit, a resistance in parallel with a condenser connected in said input and said output circuit, a source of current and the primary of a transformer connected in said output circuit, means for applying said signal to said input circuit, a plurality of thermionic valves, each having a plate, filament, and grid, a load, means for connecting the plate impedances of each of said valves, said source of current and said load in a series circuit, means for applying variations in voltage across the secondary of said transformer to the grid of a first of said valves, means for applying voltage variations across said condenser to the grid of a second of said valves to render said circuit non-conductive to input voltages of greater than predetermined duration, and means for indicating voltage variations across said load.

11. In a device for indicating the durations of signals, means for producing positive pulses varying in magnitude with said durations, means for producing a voltage varying with the envelope of said pulses and means for indicating the magnitude of said voltage.

12. In a device for indicating durations of signals, means for producing positive pulses varying in magnitude with said durations, means for producing a voltage varying with the envelope of said pulses, said last means comprising a vacuum tube having a plurality of grids and an output circuit, a resistance in parallel with a condenser connected in the common circuit of said output and said grids, means for applying said pulses to a first of said grids, means for controlling the potential of a second of said grids to render said output conductive only to said pulses, and means for indicating the voltage across said condenser.

13. In a circuit for indicating the duration between two positive pulses, a vacuum tube having an input and an output circuit, a resistance in parallel with a condenser connected in said input and said output circuit, the primary of a transformer and a source of current connected in said output circuit, means for applying said pulses to said input circuit, and means for indicating the magnitude of voltage variations across the secondary of said transformer.

OLIVER T. FRANCIS.

REFERENCES CITED

The following references are of record in the file of this patent:

UNITED STATES PATENTS

| Number | Name | Date |
|---|---|---|
| 2,269,603 | Rockwood | Jan. 13, 1942 |
| 2,312,778 | Short | Mar. 2, 1943 |
| 2,288,554 | Smith | June 30, 1942 |
| 2,126,895 | Knott | Aug. 16, 1938 |
| 2,274,992 | Nelsen | Mar. 3, 1942 |